Oct. 6, 1970 M. J. REILLY ET AL 3,532,379
CRASHLOAD ATTENUATING AIRCRAFT CREWSEAT
Filed May 2, 1968 3 Sheets-Sheet 1

INVENTORS:
MASON J. REILLY,
JOSEPH E. GONSALVES, JR.,
RALPH J. MILLIDGE,
BY Albert V. Hilburger
ATTORNEY

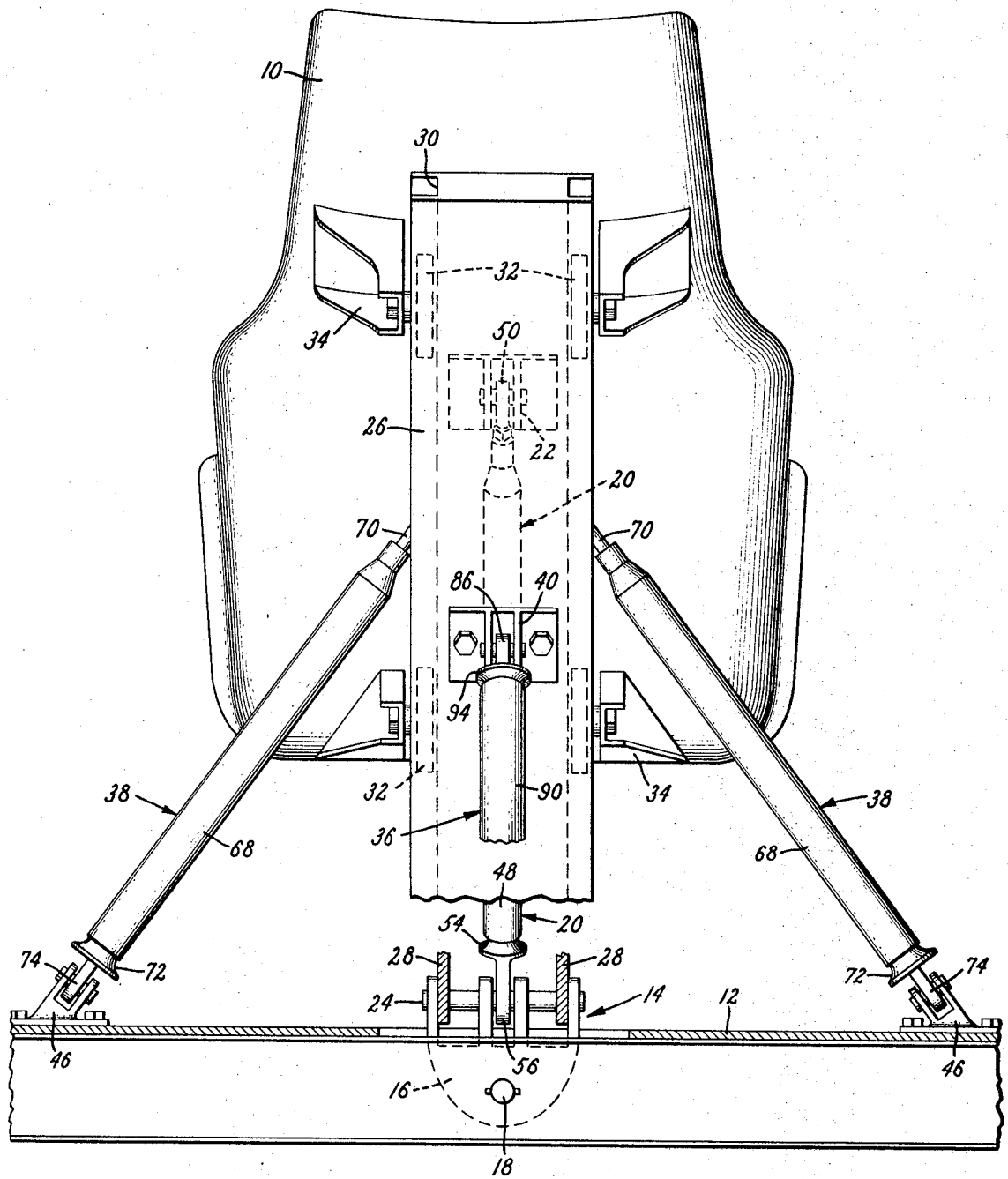

Oct. 6, 1970 — M. J. REILLY ET AL — 3,532,379
CRASHLOAD ATTENUATING CREWSEAT

Filed May 2, 1968 — 3 Sheets-Sheet 3

INVENTORS:
MASON J. REILLY,
JOSEPH E. GONSALVES, JR.,
RALPH J. MILLIDGE,
BY Albert J. Hilburger
ATTORNEY

United States Patent Office 3,532,379
Patented Oct. 6, 1970

3,532,379
CRASHLOAD ATTENUATING AIRCRAFT CREWSEAT
Mason J. Reilly, Timonium, Md., and Joseph E. Gonsalves, Jr., Springfield, and Ralph J. Millidge, Chester, Pa., assignors to The Boeing Company, Seattle, Wash., a corporation of Delaware
Filed May 2, 1968, Ser. No. 726,174
Int. Cl. B60r 21/10
U.S. Cl. 297—216                                        14 Claims

ABSTRACT OF THE DISCLOSURE

Apparatus for attenuating the impact of loads imparted to an occupant of a vehicle in the event of a crash. A seat for the occupant is universally mounted at a single location but is normally restrained against movement by means of frangible struts. The struts are so arranged as to resolve a force imposed on the occupant into its rectangular components and each strut is adapted to yield in the event it is subjected to a component of the load which is greater than a predetermined value.

---

This invention relates generally to seats adapted for use in a vehicle and particularly to seats adapted to attenuate the impact of loads imparted to an occupant in the event of a crash of the vehicle.

Heretofore, it was usual practice to provide load attenuating seats which were yieldable only in one direction in the event of a crash while being substantially nonyieldable or rigid in all other directions. These seats served to absorb loads applied to an occupant in this one direction but were ineffective to yield to loads applied in any of the other directions. Whenever loads in excess of a tolerable value were imparted to the occupant in these other directions, it often followed that the occupant was injured.

It is the intent of the present invention to provide for an occupant of a vehicle, a seat capable of absorbing the impact of a peak load regardless of its direction so that the effective load imparted to the occupant is reduced to a tolerable value and spread over a period of time. To this end, the seat is universally mounted at a single location so as to have freedom of movement in all directions but is normally restrained against movement by means of frangible struts. The struts are positioned in transverse planes which intersect in a line passing through the single mounting location whereby a load imposed upon the occupant is resolved into its rectangular components. Each strut is adapted to yield in the event it is subjected to a component of the load which is greater than a predetermined value.

Therefore, a primary object of the invention is to provide a new and improved impact attenuating seat for a vehicle.

Another object of the invention is to provide a new and improved impact attenuating seat adapted to absorb the impact of peak loads resulting from a crash of the vehicle.

Another object of the invention is the provision of a new and improved seat which is universally mounted and adapted to yield to loads in excess of a predetermined magnitude imposed on an occupant, regardless of the direction of the load.

A further object of the invention is the provision of a new and improved impact attenuating seat so constructed as to resolve loads imparted on an occupant in the event of a crash into their rectangular components. A related object is the provision of such a seat having stabilizing struts normally adapted to restrain movement of the seat in the absence of a predetermined load but adapted to yield in the presence of a predetermined load.

Other and further objects and advantages of the invention will be obvious or will be described in the description which follows taken together with the accompanying drawings.

In the drawings, in which like numerals refer to like parts throughout:

FIG. 2 is a rear elevation view of the seat illustrated in FIG. 1;

Figure 1:
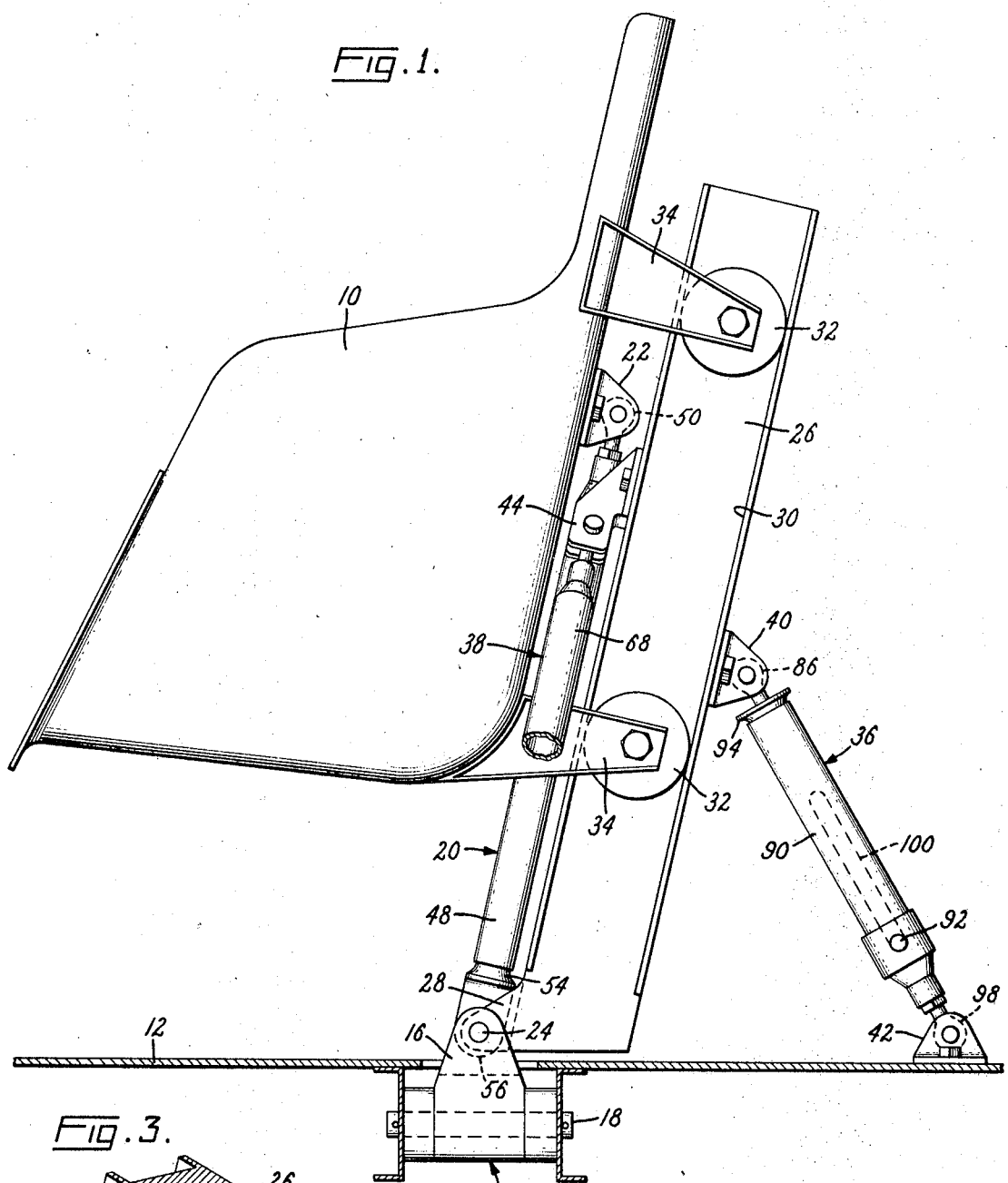
FIG. 1 is a side elevation view of a seat embodying the present invention.
Figure 4:
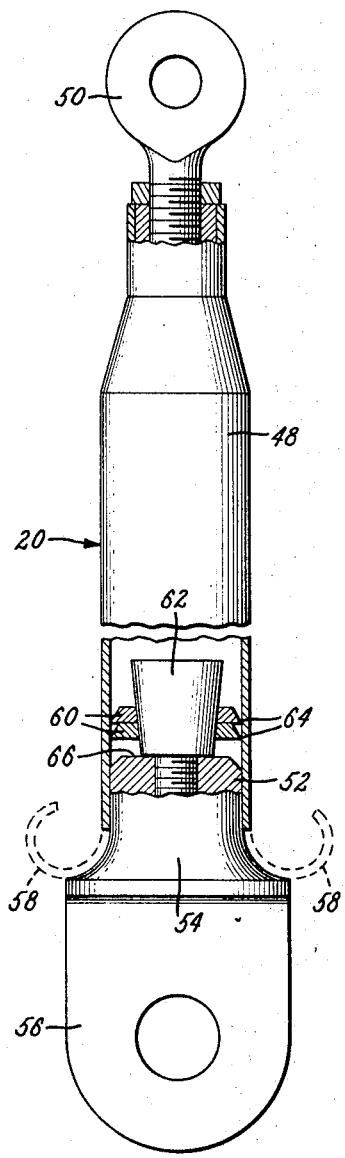
Figure 5:
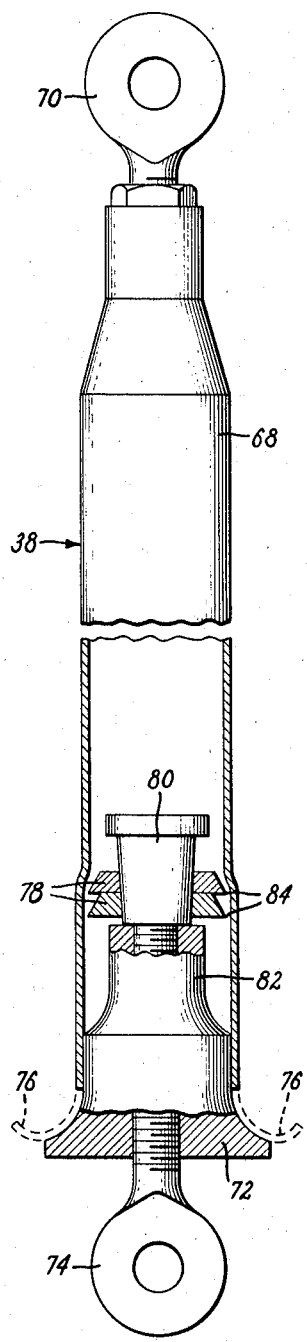
Figure 6:
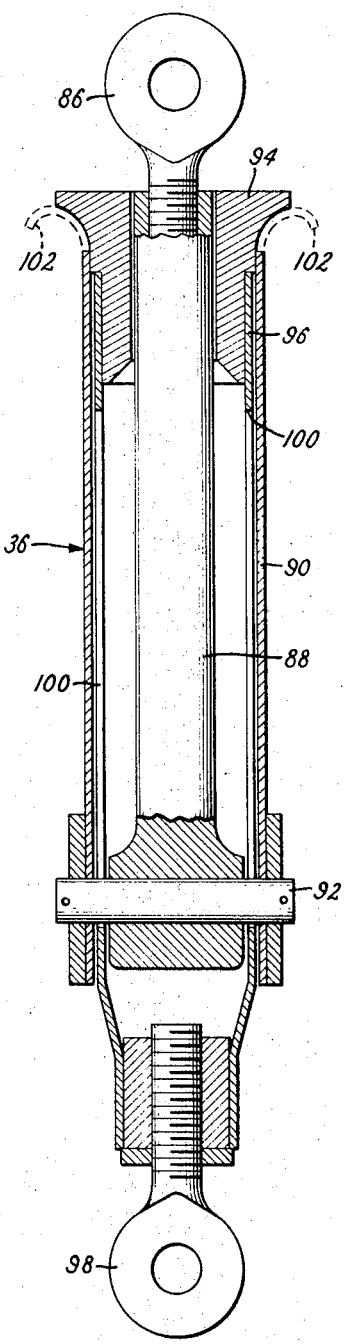

FIGS. 4, 5, and 6 are detail side elevation views, partly broken away and in section, illustrating in greater detail certain parts shown in FIGS. 1 and 2.

Figure 3:
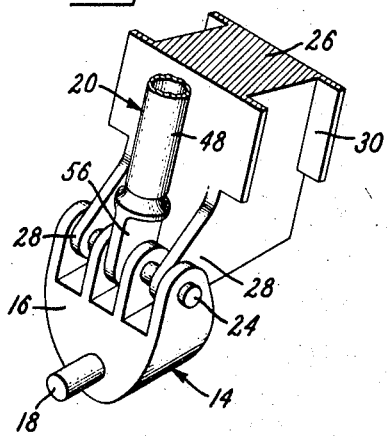
FIG. 3 is a detail perspective view of parts shown in FIGS. 1 and 2.

Refer now to the drawings and initially to FIGS. 1 and 2 which illustrate a seat 10 mounted on a floor or base 12 of a vehicle such as an aircraft (not shown). Primary support for the seat 10 on the base 12 is provided by a universal joint 14 (see especially FIG. 3) which includes a yoke 16 which is rotatably mounted on a longitudinally extending pin 18 suitably mounted on the base 12. A first or vertical strut 20 is pinned at one end to an ear 22 fixed to the seat 10 and at its opposite end is connected to the yoke 16 by a laterally extending pin 24.

Additional support for the seat 10 is provided by a guide post 26 having spaced ears 28 adjacent a bottom end rotatably mounted on the pin 24. The guide post 26 extends upwardly in a generally vertical direction and is provided with oppositely facing channels 30 which extend for substantially its entire length. Rollers 32 are rotatably mounted, respectively, on a plurality of rearwardly extending brackets 34 integral with the seat 10 and engage the channels 30 so that, in the absence of the vertical strut 20, the seat 10 would be free to move lengthwise of the guide post 26.

Secondary components for supporting the seat 10 include a longitudinal strut 36 and a pair of lateral struts 38 which provide stability for the seat 10, respectively, in the longitudinal and lateral directions. Specifically, the longitudinal strut 36 extends between an ear 40 fixed to the guide post 26 at a location spaced above the base 12 and an anchor 42 fixed to the base 12 at a location spaced rearwardly (toward the right in FIG. 1) of the universal joint 14. In a similar fashion, the lateral struts 38 extend between respective brackets 44 fixed to the guide post 26 at a location a substantial distance above the base 12 and suitable anchors 46 fixed to the base 12 at locations spaced laterally of the universal joint 14 (to the left and to the right as seen in FIG. 2). Vertical and horizontal adjustments of the seat relative to the base 12 may be performed by suitable devices (not shown) in order to accommodate occupants of various sizes.

It will be appreciated that longitudinal axes of the vertical strut 20, the guide post 26, and the longitudinal strut 36, all lie in a common, longitudinally extending plane and that longitudinal axes of the vertical strut 20, and the lateral struts 38 similarly lie in a laterally extending plane. Further, as seen in FIGS. 1 and 2, the longitudinal and lateral planes are mutually perpendicular and intersect along a line passing substantially through an effective center of the universal joint 14. By reason of this construction, the vertical strut 20 is subject only to vertical loads imparted to an occupant of the seat 10, the longitudinal strut 36 is subject only to longitudinally directed loads, and the lateral struts 38 are subject only to laterally directed loads. If an obliquely directed load is imparted to an occupant of the seat 10, the struts 20, 36, and 38 serve to resolve the load into its rectangular components with each strut bearing its appropriate component of the load.

Thus, when a vertical load or at least a vertical component of the load is imparted to an occupant of the seat 10, the vertical strut is compressed between the ear 22 and the pin 24 of the universal joint 14. Viewing FIG. 4, the vertical strut 20 is seen to include a tube 48 swaged at its upper end for threaded engagement with a fittting 50 pinned to the ear 22 (FIGS. 1 and 2). At its opposite end, the tube 48 is pressed fitted on a reduced portion 52 of a die 54 integral with a lower fitting 56 received on the pin 24 (FIGS. 1 and 2). The strength of the tube 48 is suitably choosen so that the vertical strut 20 is able to support compressive loads below a predetermined value. However, when this predetermined load is exceeded, the die 54 is forced into the tube 48 splitting the tube and peeling it into petals 58 indicated by dotted lines in FIG. 4.

In addition, the strut 20 is capable of resisting tensile loads which tend to separate the upper fitting 50 from the lower fitting 56. Such a tendency can occur when the compressive load on the vertical strut becomes jerky or discontinuous. For this purpose, one or more radially split spring washers 60 are loosely received on an inversely tapered mandrel 62 suitably fixed, as by threaded engagement, to the reduced portion 52 of the die 54. Outer peripheral edges 64 of the spring washers 60 are beveled so as to lightly engage the inner surface of the tube 48. When an excessive compressive force causes the tube 48 to move toward the die 54, the spring washers 60 are thereby advanced against an abutment 66 of the reduced portion 52, but do not substantially hinder passage of the tube 48. However, upon application of a tensile load, the outermost edges 64 dig into the inner surface of the tube 48 so as to advance with the tube. However, as the tube advances, the spring washers 60 are drawn from the small end of the mandrel 62 to its large end and in the process are expanded outwardly to an increasingly greater extent. The spring washers thus engage the tube 48 in an increasingly firm manner until the tube 48 is held against further movement away from the die 54.

When a laterally directed load or at least a laterally directed component of a load is imparted to an occupant of the seat 10, one of the lateral struts 38 is positioned to resist a compressive load while the other lateral strut 38 is positioned to resist a tensile load. The lateral struts 38 are constructed in a manner similar to that of the vertical strut 20. Viewing FIG. 5, each lateral strut 38 is seen to include a tube 68 swaged at its upper end for threaded engagement with an upper fitting 70 which, in turn, is pinned to the bracket 44 (FIGS. 1 and 2). At its lower end, the tube 68 is flared out slightly for fitting engagement with a die 72. A lower fitting 74 is threadedly engaged with the die 72 and is pinned to its associated anchor 46. Each lateral strut 38 is capable of absorbing, without deformation, tensile or compressive loads below a predetermined value. However, when this predetermined load is exceeded, the seat 10 moves laterally and with it the guide post 26 which swings about the longitudinal pin 18 of the universal joint 14. In the lateral strut 38 receiving the compressive load, when the bracket 44 on the guide post 26 moves toward an anchor 42, the upper fitting 70 is urged toward the lower fitting 74. The tube 68 is thus compressed against the die 72 and is split and peeled back in the form of petals 76 indicated by dotted lines in FIG. 5. In the lateral strut 38 receiving the tensile load, the die 72 tends to withdraw from the tube 68. However, in a manner similar to that employed in the vertical strut 20, each lateral strut 38 is capable of resisting tensile loads. To this end, spring washers 78 are loosely received at a reduced end of an inversely tapered mandrel 80 threadedly engaged with a reduced portion 82 of the die 72. Outer peripheral edges 84 of the spring washers 78 are suitably beveled so as to freely permit the tube 68 to advance toward the die 72 even when the outermost edges 84 engage the inner surface of the tube 68. However, upon application of a tensile load after the edges 84 come into engagement with the tube 68, further movement of the tube away from the die 72 causes the edges 84 to dig into the inner surface of the tube 68 so that the washers advance with the tube. The spring washers 78 are thus drawn from the small end of the mandrel 80 to its large end and in the process are expanded outwardly to an increasingly greater extent until further movement of the tube 68 away from the die 72 is prevented.

When a longitudinally directed load or at least a longitudinally directed component of a load is imparted to an occupant of the seat 10 tending to throw the occupant forwardly out of the seat, the longitudinal strut 36 is subjected to tensile forces. Viewing FIG. 6, an upper fitting 86 is threadedly engaged with one end of a rod 88 which in turn is connected to an outer tube 90 by means of a diametrically extending pin 92. A die 94 is suitably fixed to an inner tube 96 and is fittingly received within the outer tube 90 adjacent its upper end. A lower end of the inner tube 96 is swaged for threaded engagement with a lower fitting 98. As the seat 10 moves forward and with it the guide post 26 swinging about the lateral pin 24 of the universal joint 14, the resulting tensile load tends to draw the upper fitting 86 pinned to the bracket 40 away from the lower fitting 98 pinned to the anchor 42. The longitudinal strut 36 is capable of absorbing, without deformation, tensile loads below a predetermine value. However, when the predetermined load is exceeded, the die 94 is drawn into the outer tube 90 as the pin 92 advances along a suitable slot 100 in the inner tube 96. The outer tube 90 is split by the die 94 and peeled back into petals 102 as indicated by dotted lines in FIG. 6. Peeling of the outer tube 90 continues until the pin 92 reaches the far end of the slot 100.

Thus, when an occupant of the seat 10 is subjected to high external loads, such as those occurring in the event of a crash of a vehicle in which the seat is located, the seat 10 remains substantially rigid so long as each of the rectangular components of the load are respectively less than a critical limit. These critical limits are defined by the capability of the human body to withstand external loads. When the critical limit is exceeded in any or all of the three directions, namely, the vertical direction, the lateral direction, and the longitudinal direction, the respective struts 20, 38, and 36 yield and permit the seat 10 to pivot on the universal joint 14 and thereby absorb the impact of the crash to protect the occupant from incurring fatal injuries.

As an added feature of the invention resulting from the construction according to which the seat 10 is mounted for vertical movement on the guide post 26, it is possible and might be desirable to provide the seat 10 with an ejection mechanism (not shown). In preparation for ejection, it would merely be necessary to suitably release the lateral struts 38 from the brackets 44 such that, upon ejection, the seat 10 is guided by the channels 30. In an aircraft so equipped, a crew member has the option of ejecting himself from the aircraft prior to an imminent crash or remaining in his seat and relying on the protection afforded by the apparatus disclosed herein.

While a particular embodiment of the present invention has been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. Apparatus for attenuating loads imparted to an occupant of a vehicle comprising: a seat for the occupant; a base; support means bearing the weight of said seat on said base at substantially a single location directly beneath said seat to provide freedom of movement about a plurality of axes, one of which axes extends in a lateral direction and another one of which axes extends in a longitudinal direction, and including frangible stabilizing means disposed along said axes to restrain movement of said seat about said axes, whereby a force imposed on the occupant is resolved into rectangular components thereof, said stabilizing means yielding when the force is greater than a predetermined magnitude.

2. Apparatus as set forth in claim 1 wherein said support means includes a universal joint permitting rotational movement of said seat about said axes.

3. Apparatus as set forth in claim 1 wherein said support means includes a universal joint and a first member connecting said seat and said joint for yieldably restraining translational movement of said seat along a first axis and said stabilizing means includes second and third members for yieldably restraining movement of said seat about said lateral and longitudinal axes, all of said members lying in mutually perpendicular planes intersecting in a line passing substantially through said universal joint.

4. Apparatus as set forth in claim 3 wherein said support means includes guide means for guiding said seat for translational movement along said first axis.

5. Apparatus as set forth in claim 4 wherein said guide means includes a guide element pivotally mounted on said universal joint and upstanding from said base and guides mounted on said seat and engageable with said guide element for movement therealong.

6. Apparatus as set forth in claim 5 wherein said guide element includes a pair of spaced channels and said guides include rollers movably engaged with said channels.

7. Apparatus as set forth in claim 1 wherein said support means includes a universal joint mounted on said base, a guide element upstanding from said base and mounted on said universal joint for rotational movement about said lateral axis and said longitudinal axis perpendicular thereto, guides on said seat and engageable with said guide element permitting translational movement of said seat along a substantially vertical axis, and a vertical strut extending between said universal joint and said seat for yieldably restraining movement of said along said vertical axis, and said stabilizing means includes a lateral strut extending between said guide element at a location above said base and said base at a location spaced laterally from said universal joint for yieldably restraining movement of said seat about said longitudinal axis and a longitudinal strut extending between said guide element at a location above said base and said base at a location spaced longitudinally from said universal joint for yieldably restraining movement of said seat about said lateral axis, said vertical, lateral, and longitudinal struts lying respectively in mutually perpendicular planes intersecting substantially at said universal joint.

8. Apparatus as set forth in claim 7 wherein said lateral strut includes a frangible tube and a die responsive to a predetermined compressive load on said seat operable for longitudinally splitting and peeling said tube to absorb said load.

9. Apparatus as set forth in claim 8 wherein said lateral strut includes expansible means for resisting tensile load after operation of said die.

10. Apparatus as set forth in claim 9 wherein said expansible means includes a tapered mandrel fixed to said die and having a small end and a large end, and a split spring washer slidably received on said mandrel, and having a peripheral edge engageable with said tube and, movable between a contracted condition adjacent said small end in the event of said compressive load, permitting relative movement between said die and said tube, and an expanded condition adjacent said large end in the event of said tensile load preventing relative movement between said die and said tube.

11. Apparatus as set forth in claim 7 wherein said longitudinal strut includes a frangible tube and a die responsive to a predetermined tensile load on said seat for longitudinally splitting and peeling said tube to absorb said load.

12. Apparatus as set forth in claim 7 wherein said vertical strut includes a frangible tube and a die responsive to a predetermined compressive load on said seat operable for longitudinally splitting and peeling said tube to absorb said load.

13. Apparatus as set forth in claim 12 wherein said vertical strut includes expansible means for resisting tensile load after operation of said die.

14. Apparatus as set forth in claim 13 wherein said expansible means includes a tapered mandrel fixed to said die and having a small end and a large end, and a split spring washer slidably received on said mandrel having a peripheral edge engageable with said tube and, movable between a contracted condition adjacent said small end in the event of said compressive load, permitting relative movement between said die and said tube, and an expanded condition adjacent said large end in the event of said tensile load, preventing relative movement between said die and said tube.

References Cited

UNITED STATES PATENTS

| | | | |
|---|---|---|---|
| 1,722,678 | 7/1929 | Peterson | 248—382 |
| 2,132,291 | 10/1938 | Fitos | 248—382 |
| 2,401,748 | 6/1946 | Dillon | 297—216 |
| 2,707,986 | 5/1955 | Johnson | 297—314 |
| 3,059,966 | 10/1962 | Spielman | 297—216 |
| 3,081,059 | 3/1963 | Hastings et al. | 248—372 |
| 3,139,304 | 6/1964 | Lehner et al. | 297—308 |
| 3,314,720 | 4/1967 | Millington et al. | 297—216 |

FRANCIS K. ZUGEL, Primary Examiner

U.S. Cl. X.R.

297—307